(12) United States Patent
Melander et al.

(10) Patent No.: US 9,116,748 B2
(45) Date of Patent: Aug. 25, 2015

(54) SYSTEM AND METHOD FOR DETERMINING PROCESSING ELEMENTS ALLOCATION

(75) Inventors: Bob Melander, Sigtuna (SE); Jan-Erik Mångs, Solna (SE)

(73) Assignee: TELEFONAKTIEBOLAGET L M ERICSSON (PUBL), Stockholm (CH)

( * ) Notice: Subject to any disclaimer, the term of this patent is extended or adjusted under 35 U.S.C. 154(b) by 226 days.

(21) Appl. No.: 13/319,590

(22) PCT Filed: Jun. 1, 2009

(86) PCT No.: PCT/IB2009/005800
§ 371 (c)(1),
(2), (4) Date: Jan. 13, 2012

(87) PCT Pub. No.: WO2010/140014
PCT Pub. Date: Dec. 9, 2010

(65) Prior Publication Data
US 2012/0117244 A1 May 10, 2012

(51) Int. Cl.
*G06F 15/173* (2006.01)
*G06F 9/50* (2006.01)

(52) U.S. Cl.
CPC ............. *G06F 9/5044* (2013.01); *Y02B 60/142* (2013.01)

(58) Field of Classification Search
CPC .......................... G06F 9/5072; H04L 12/5695
USPC .......................................... 709/226, 223, 225
See application file for complete search history.

(56) References Cited

U.S. PATENT DOCUMENTS

| | | | |
|---|---|---|---|
| 7,464,147 B1* | 12/2008 | Fakhouri et al. | 709/223 |
| 8,205,205 B2* | 6/2012 | Franke | 718/103 |
| 2006/0026592 A1 | 2/2006 | Simonen et al. | |
| 2006/0212871 A1* | 9/2006 | Cook | 718/104 |
| 2010/0057913 A1* | 3/2010 | DeHaan | 709/226 |

(Continued)

FOREIGN PATENT DOCUMENTS

| | | |
|---|---|---|
| EP | 1 841 180 A1 | 10/2007 |
| WO | 2006/097512 A1 | 9/2006 |

OTHER PUBLICATIONS

Kennedy et al. "Toward a Framework for Preparing and Executing Adaptive Grid Programs." 2002. IPDPS '02 Proceedings of the 16th International Parallel and Distributed Processing Symposium, p. 322.*

(Continued)

*Primary Examiner* — Hitesh Patel
(74) *Attorney, Agent, or Firm* — Patent Portfolio Builders PLLC

(57) ABSTRACT

A unit, computer readable medium and method for providing dynamic processing elements allocation in a network for a task of a user based on a request of the user. The method includes receiving at the unit of the network the request that includes at least a required condition or a preference related to the task, determining a first processing elements allocation in the network for executing the task such that the first processing elements allocation complies with the request, monitoring whether a trigger is received and indicates that at least a characteristic of the request is violated by the first processing elements allocation, and determining, in response to the received trigger, a second processing elements allocation in the network for executing the task such that the second processing elements allocation complies with the request.

22 Claims, 8 Drawing Sheets

(56) References Cited

U.S. PATENT DOCUMENTS

2011/0060839 A1* 3/2011 Ohta et al. .................... 709/229
2014/0280889 A1* 9/2014 Nispel et al. .................. 709/224

OTHER PUBLICATIONS

International Search Report mailed Mar. 17, 2010 in corresponding International Application No. PCT/IB2009/005800.

Written Opinion mailed Mar. 17, 2010 in corresponding International Application No. PCT/IB2009/005800.

Kennedy et al., "Toward a Framework Foe Preparing and Executing Adaptive Grid Programs" Fort Lauderdale FL, USA, Apr. 15, 2002, pp. 171-175, XP010591222.

International Preliminary Report on Patentability mailed Sep. 16, 2011 in corresponding International Application No. PCT/IB2009/005800.

* cited by examiner

60 —⁀DROPLET {
  62 —⁀IDENTIFIER id;
  64 —⁀MANIFESTATION manif;
  66 —⁀CREDENTIALS creds;
}

FIG. 5

Droplets are X,Y,Z
X is downstream of Y
Path bandwidth Y -> X > 10 Mbps

Y is downstream of Z
Path bandwidth Z -> Y > 50 Mbps

Minimize Propagation Delay (Y, X)

CPU_intensive(X)
disk_intensive(Y), capacity > 200 GB
Location(Z) = Stockholm

FIG. 6

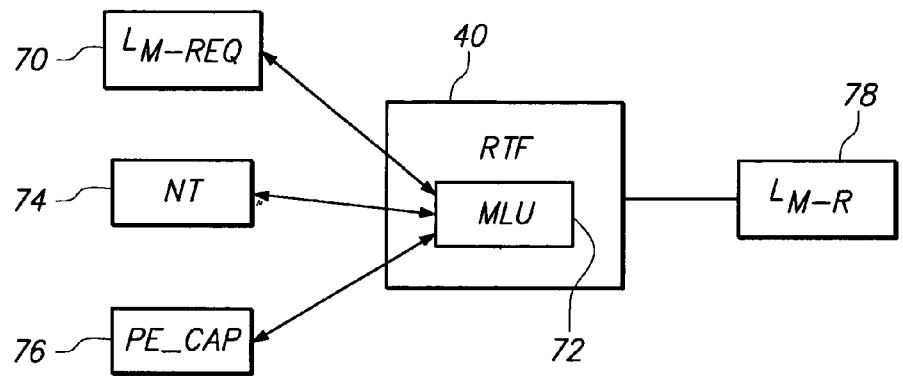
FIG. 7
Droplet X -> Processing Node PN4
Droplet Y -> Processing Node PN1
Droplet Z -> Processing Node PN7
FIG. 8
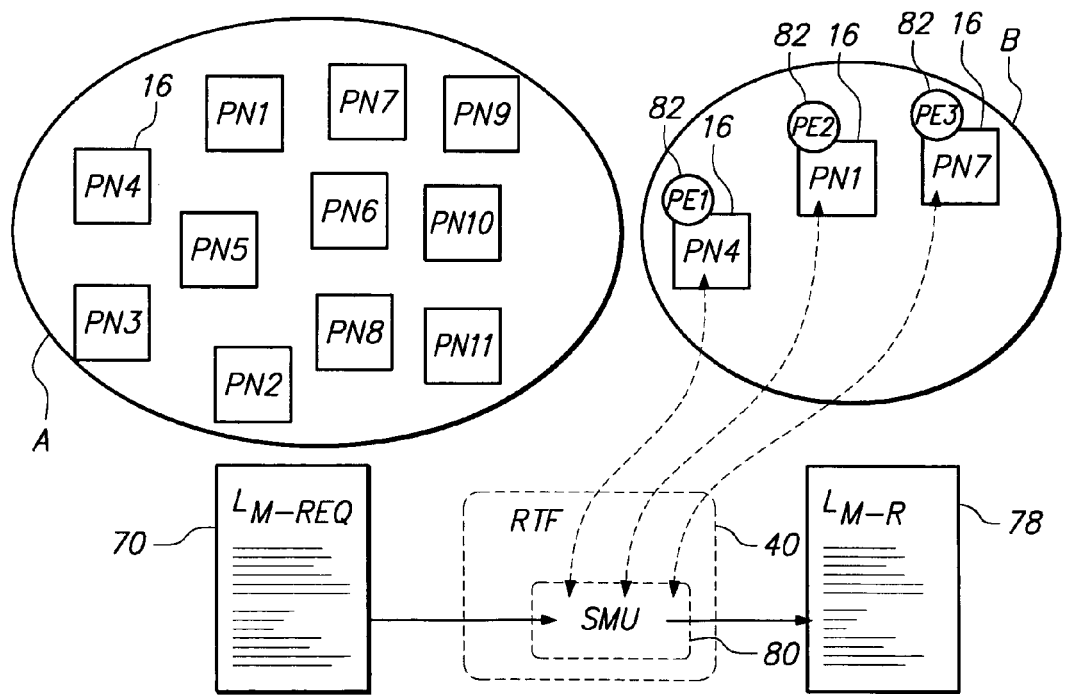
FIG. 9

Droplet X -> Processing Node PN4 as Processing Element PE1
Droplet Y -> Processing Node PN1 as Processing Element PE2
Droplet Z -> Processing Node PN7 as Processing Element PE3

A is downstream of C
Minimize Propagation Delay (A,C)
Number of router hops between (A,C) < 2
C needs storage > 200 MB, non-permanent

SYSTEM AND METHOD FOR DETERMINING PROCESSING ELEMENTS ALLOCATION

TECHNICAL FIELD

The present invention generally relates to systems, software and methods and, more particularly, to mechanisms and techniques for dynamical determining processing elements allocation in a network.

BACKGROUND

During the past years, the evolution of distributed computing that is offered as a service to various clients was driven by the concept of leasing hardware and software as metered services. One such model is cloud computing. Cloud computing is a style of computing in which dynamically scalable and often virtualized resources are provided as a service over the Internet to interested clients. The clients need not have knowledge of, expertise in, or control over the technology infrastructure "in the cloud" that supports them.

The concept incorporates one or more of the infrastructure as a service, platform as a service and software as a service as well as other recent technology trends that have the common theme of reliance on the Internet for satisfying the computing needs of the users. Cloud computing services usually provide common business applications online, which can be accessed from a web browser, while the software and data are stored on the servers. Such a scenario is illustrated in FIG. 1, in which a user 10 connects via, for example, Internet 12, to a network 14. The network 14 may include one or more processing nodes (PN) 16. The processing nodes PN 16 may belong to one or more providers.

Common to the operational cloud platforms are the implementation of data centers (often of massive size) hosting clusters of servers. These servers may be logically sliced using virtualization engines. Cloud platforms are traditionally distributed across multiple data centers to achieve robustness and global presence. However, this distributed presence is coarse-grained, i.e., data center-based clouds consider the entire network operator simply as the first mile connectivity. The closeness of the data centers to end-users is thus limited.

However, some end-users may benefit from having processing elements/nodes of the network closer to them than the data centers-based clouds can provide. One such example is a system deployed on a distributed platform, for example, video-on-demand systems, or enterprise information system accelerators. Such a system should be robust and scalable so that, for instance, a failing equipment or transiently increased loads do no jeopardize the systems' operation, stability and availability.

Providing servers closer to end-users imply more distributed and geographically scattered server constellations. For example, when the processing elements/nodes are highly distributed and geographically scattered across an operator's network for being situated closest to the end-users, one or more of the following problems may appear.

As the end-users may be concerned with selecting processing elements/nodes that are geographically located in a desired area, the end-users, e.g. system and/or software developers may have to know which processing elements/nodes are available, where are they located, how can these processing elements/nodes be accessible, which specific processing element/node should be used for a certain component of an application.

To select appropriate processing elements/nodes in response to all these questions, especially when the number of resources/servers in a large network may be in the range of hundreds or thousands, is challenging, i.e., time consuming and/or prone to mistakes. Supplementary resources have to be employed only to correctly distribute the existing tasks/applications to the large network. The complexity of the selection becomes itself a problem, which may overwhelm the end-user, especially if the platform is a simple constellation of independent servers, i.e., servers that are "glued" together by nothing more than plain IP connectivity.

Further complications arise as the network operator, i.e., the operator of network 14 in FIG. 1, maintains confidentiality of the design and topology of the network, e.g., the locations of the processing elements/nodes, the available resources, the particular division of the real nodes into virtual nodes, etc. In this case, even if the end-user 10 has the capability to determine which machine (real or virtual) will process which component of an application, by not knowing the topology and availability of the network 14, the end-user 10 cannot make use of the full advantages provided by the network 14.

For illustrating the limitations of the traditional methods and networks, the following two examples are considered. Two real life tasks are deployed in an operational network-based processing platform. The first task is to dispatch an application on every processing element close to an edge of the network 14 that is closer to the end-user 10. The second task is to execute a distributed application, which includes two software modules (x and y), on separate processing elements while fulfilling the condition that x is always upstream of y (with respect to the end user 10).

Having to manually process such tasks as well as to implement the distribution and communication aspects of the software components and their interworking is challenging and time consuming for the system and/or software developer, especially when the number of processing elements/nodes is large. In one example, FIG. 2 generically illustrates the minimum effort that goes into such manual process. Initially, in step 20, the user 10 determines, on his/her side, which processing elements from the network are necessary, where are they located, etc. Then, in step 22, after figuring out the processing elements allocation, user 10 contacts network 14 and request the necessary resources. The network 14 replies in step 24 to user 10, after running the applications desired by the user. The network 14 provides in this step the user with the results of the applications that were run on the processing elements.

However, if for any reason the network changes or other characteristics to be discussed later change in step 26, i.e., its topology and/or a characteristic required by the user, the user 10 has to determine again, in step 27, what processing elements of the network to be used for which application. Then, the user 10 manually re-enters in step 28 the multiple requests to be transmitted to the network 14. Thus, the network configuration change in step 26 forces the user to redo all the work previously performed in steps 20 and 22, which is inconvenient for the user.

More specifically, with regard to the first task discussed above, the user determines in step 20 of FIG. 2 the number of processing elements to run the desired task and also, based on his geographic location and limited geographic location provided by the network, only those processing elements that are closer to the user. With regard to the second task, the user determines in step 20 of FIG. 2 which processing elements would execute software module x and which processing elements would execute software module y. Then, the user has to determine in the same step 20 which processing elements satisfy the condition that x is always upstream of y with respect to the user 10.

From these simplified examples that require resources for only one application, it can be seen that the amount of calculation that takes place at the user side is high and time consuming.

Another example that exemplifies the problems of the traditional systems is discussed next. Consider a video-on-demand system. The core functionality of this system is providing video content using appropriate codecs, interacting with the end-user client, accessing and conditional controlling functions, searching a database of video titles and associated user interface, billing, storing of video files, transcoding proxies that adapt video streams to the capabilities of the end-user client, etc.

The software components realizing these functionalities should themselves be (internally) robustly implemented (e.g., the code should deal with error conditions in an appropriate manner, for example, use thread pools if request rates are assumed to be high, etc). In order to make the overall system robust and scalable, the components need to be combined and orchestrated appropriately. These desired properties of the system may require having redundant hot standby components that can step in if a certain component fails, or dormant components that can be activated to scale up the system if the load suddenly increases. However, to achieve these features requires extensive experience and skills. This means that developers holding expertise in video coding, video transport and video rendering in the video-on-demand example above may lack such competence. Thus, creating such a system is demanding and man-resource intensive. Even more, supposing that the developer is able to determine which processing elements of the network should execute his or her applications. However, a change in the configuration of the network (for example a failed connection or component) may alter the processing elements allocation and thus, the developer may be forced to redo the processing elements allocation, which results in more wasted time and resources.

Accordingly, it would be desirable to provide devices, systems and methods that avoid the afore-described problems and drawbacks.

SUMMARY

Remote computing systems free the users from having and maintaining sophisticated computing systems. However, such remote computing systems, due to their structure, require intense user evaluation of what processing elements of the computing systems to be used.

According to one exemplary embodiment, there is a method for providing dynamic processing elements allocation in a network for a task of a user based on a request of the user. The method includes receiving at a unit of the network the request that includes at least a required condition or a preference related to the task; determining a first processing elements allocation in the network for executing the task such that the first processing elements allocation complies with the request; monitoring whether a trigger is received and indicates that at least a characteristic of the request is violated by the first processing elements allocation; and determining, in response to the received trigger, a second processing elements allocation in the network for executing the task such that the second processing elements allocation complies with the request.

According to another exemplary embodiment, there is a unit in a network for providing dynamic processing elements allocation in the network for a task of a user based on a request of the user. The unit includes a processor configured to receive the request that includes at least a required condition or a preference related to the task, determine a first processing elements allocation in the network for executing the task such that the first processing elements allocation complies with the request, monitor whether a trigger is received and indicates that at least a characteristic of the request is violated by the first processing elements allocation, and determine, in response to the received trigger, a second processing elements allocation in the network for executing the task such that the second processing elements allocation complies with the request.

According to still another exemplary embodiment, there is a computer readable medium including computer executable instructions, wherein the instructions, when executed, implement a method for providing dynamic processing elements allocation in a network for a task of a user based on a request of the user. The user includes providing a system comprising distinct software modules, wherein the distinct software modules comprise a run-time fabric module and a mapping logic unit module; receiving at the run-time fabric the request that includes at least a required condition or a preference related to the task; determining at the mapping logic unit module a first processing elements allocation in the network for executing the task such that the first processing element allocation complies with the request; monitoring whether a trigger is received and indicates that at least a characteristic of the request is violated by the first processing elements allocation; and determining, in response to the received trigger, a second processing elements allocation in the network for executing the task such that the second processing elements allocation complies with the request.

It is an object to overcome some of the deficiencies discussed in the previous section and to provide a functionality capable of dynamically determining the processing elements allocation. One or more of the independent claims advantageously provides such functionality.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a schematic illustration of the structure of a droplet according to an exemplary embodiment;

FIG. 6 is a schematic illustration of a list of requirements sent by the user to the network according to an exemplary embodiment;

FIG. 7 is a schematic diagram of a functionality distributed at a processing node of the network according to an exemplary embodiment;

FIG. 8 is a schematic diagram of a mapping list generated by the functionality according to an exemplary embodiment;

FIG. 9 is a schematic diagram of the functionality according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a system including a distributed network having plural processing nodes. However, the embodiments to be discussed next are not limited to this system but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, the user specifies requirements and/or preferences as to where processing elements (with or without specified capabilities) should be allocated. Those requirements and/or preferences are sent to the network to a first functionality that is configured to allocate the appropriate processing elements and make the processing elements available to the user. Further, the first functionality may automatically monitor the requirements and/or preferences and the status of the network, and update the processing elements allocation as the status of the network of other characteristics changes in time. Thus, instead of having the user determining which processing elements to use, the user sends his/her requirements and/or preferences to the first functionality and the first functionality of the network determines the processing elements allocation that satisfies the requirements and/or preferences of the user. In addition, the user does not have to monitor the change of the network as a second functionality dynamically monitors the status of the network. The first and second functionalities may be combined as one functionality. Also, each functionality may operate independent of the other functionality.

Figure 1:
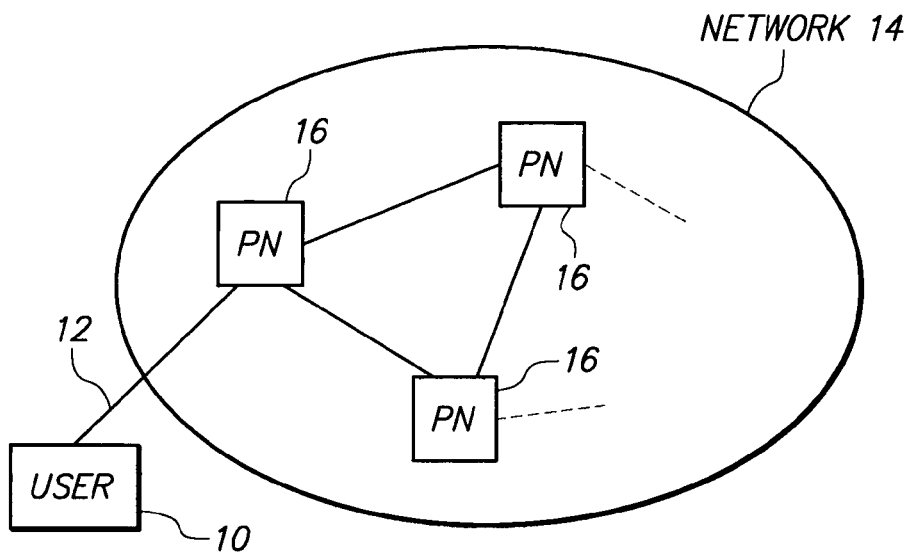
FIG. 1 is a schematic diagram of a network including processing nodes.
Figure 2:
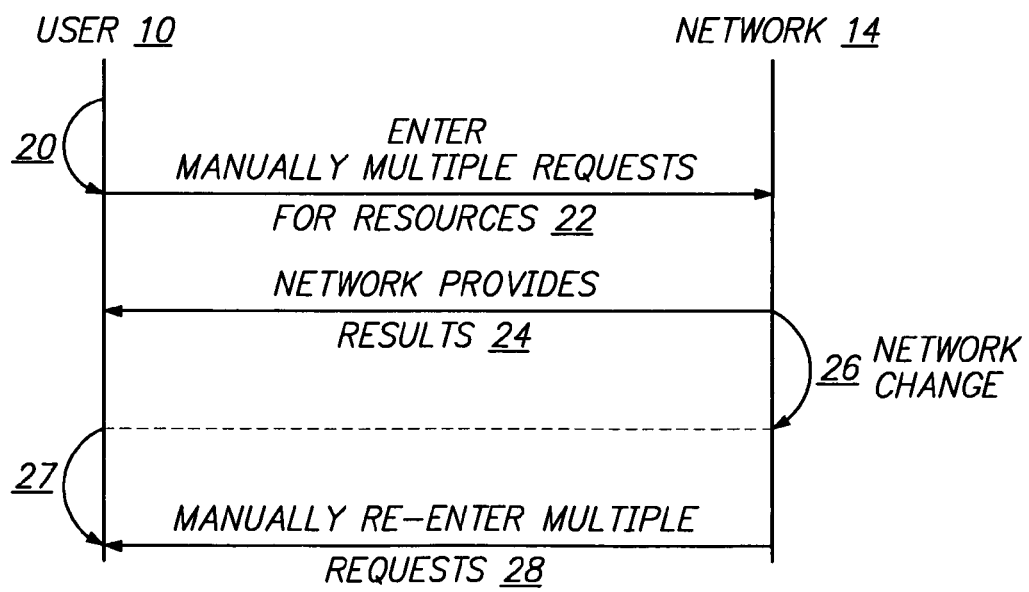
FIG. 2 is a schematic diagram illustrating signaling between a user and the network of FIG. 1.
Figure 3:
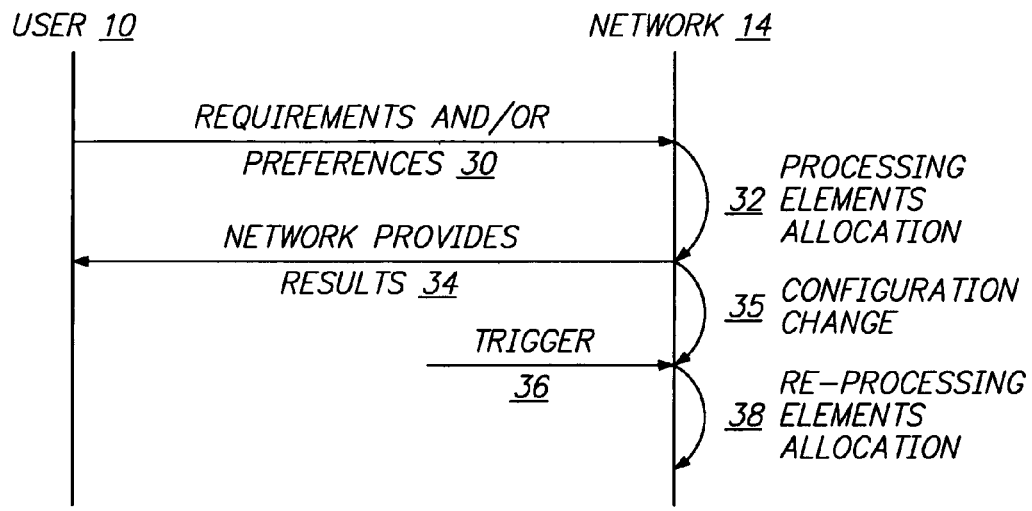
FIG. 3 is a schematic diagram illustrating signaling between a user and a network according to an exemplary embodiment.

According to an exemplary embodiment which is illustrated in FIG. 3, the user 10 sends in step 30 a request to the network 14. The request includes the requirements and/or preferences of the user. The amount of time invested in determining the requirements and/or preferences is less that the amount of time necessary for figuring out the processing elements allocation. The first functionality noted above processes the request from the user in step 32 and determines the processing elements allocation. After the task from the user is distributed in the network and computed, the results are provided back in step 34 to the user 10 by the network 14. When a change in the configuration of the network 14 or a change of other characteristics to be discussed later occurs in step 35, a second functionality (which will also be discussed later) detects the change and informs the network 14 in step 36 about a need to recalculate the processing elements allocation. The first functionality recalculates the new allocation in step 38 so that the requirements and/or preferences of the user are fulfilled even when the change in the network configuration has occurred. In one exemplary embodiment, no input from user 10 is necessary for recalculating the processing elements allocation. As will be discussed later, the second functionality may be distributed inside the network, in an application of the user, at a client of the user, etc.

The first functionality may also upload software components or other items, like settings on the allocated processing elements as specified by the user. However, in another embodiment, the functionality may be used to receive instructions from a user for finding an appropriate processing node in the network. Based on a result received by the user from the network, the user may log in into the found processing node using, for example, an ssh connection.

Because there are many different types of objects that may possibly be uploaded (this term is used to describe not only uploading an object but also, as discussed in the previous paragraph, determining a later remote login session) from the user to the network based on the first functionality, the generic name of "droplets" is introduced for these items. Thus, a droplet my include software, settings, etc. Next, some specific examples of a network and information exchanged between the end-user and the network are discussed with regard to FIGS. 4-8. The embodiments discussed with regard to FIGS. 4-8 assume that the network configuration is constant and thus, once an allocation is determined, that allocation is accurate. This aspect corresponds to a static network. Later exemplary embodiments would describe how to perform the processing elements allocation when the dynamic of the network 14 is taken into account, i.e., how to dynamically determine the processing elements allocation.

Figure 4:
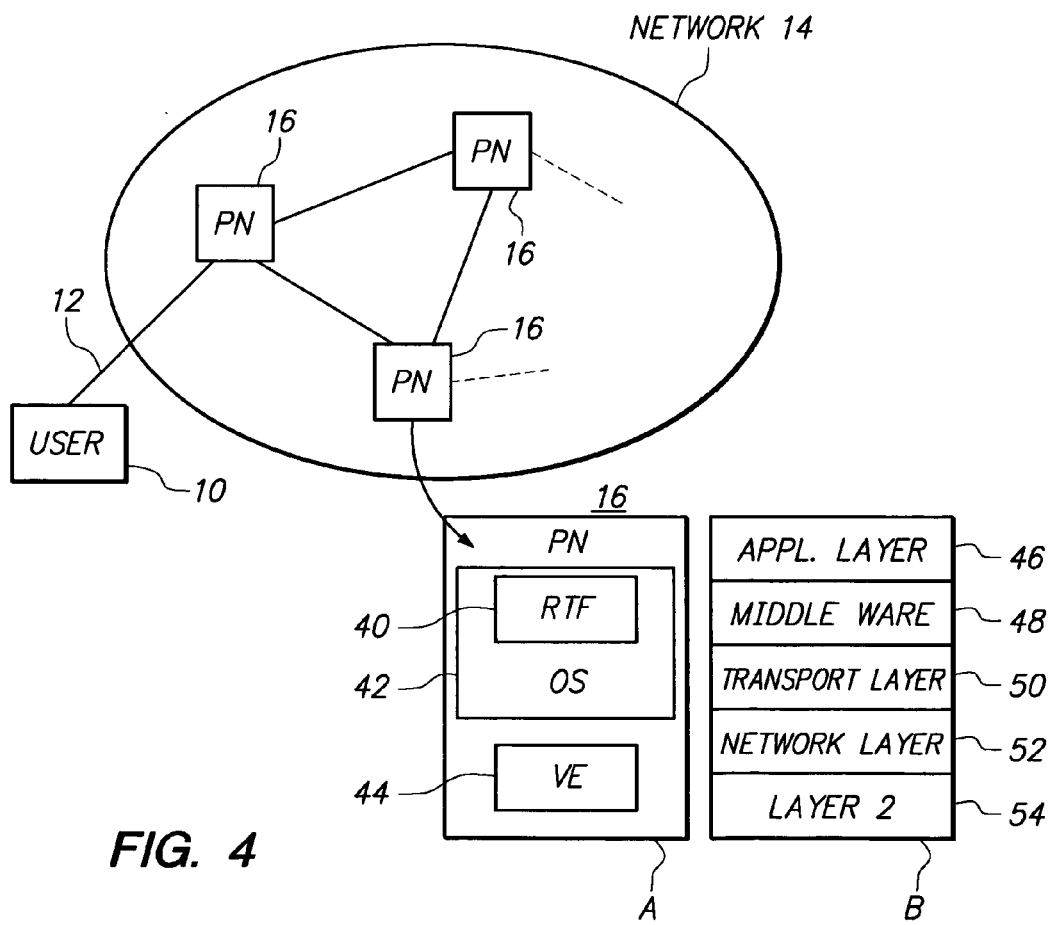
FIG. 4 is a schematic diagram of a network that includes a functionality according to an exemplary embodiment.

According to an exemplary embodiment shown in FIG. 4, the user 10 is connected, for example, via Internet 12 to a network 14. Instead of being connected via Internet 12, user 10 may be connected to the network 14 via other mechanisms, for example, ftp, telnet, ssh, a virtual private network (VPN), etc. The Internet connection 12 may be provided by a network provider different from network 14 or by the operator of network 14. The network 14 may include one or more processing nodes PN 16. The number of processing nodes PNs 16, which could be standalone servers, rack mounted servers, server blades attached to routers or switches, line cards with processing capabilities, base stations, etc., may be in the range of tens to thousands.

A Run-Time Fabric (RTF) 40 may run on one or more processing nodes 16. FIG. 4 illustrates one such processing node PN 16 having the run-time fabric 40 installed therein. The run-time fabric 40 may be a distributed middleware that creates a distributed execution platform of the processing nodes. In another exemplary embodiment, the run-time fabric 40 may be achieved by using a dedicated circuitry. Still in another exemplary embodiment, the run-time fabric is implemented by combining software and hardware to produce the desired functionality. The embodiment shown in FIG. 4 has the run-time fabric 40 running as software in the operation system (OS) 42. In another application, the run-time fabric 40 may interact with the OS 42 but does not have to run in the OS 42. In still another application, the run-time fabric 40 may be distributed on plural processing nodes PN 16.

A processing node PN 16 may also include a virtualization engine (VE) 44 that allows the physical processing node PN 16 to be sliced into multiple virtual instances. The user 10, as will be discussed later, may require that an application or a component of an application may be run on a specified processing node PN 16, a part of the processing node PN 16, or a virtual instance that is supported by the processing node PN 16. The high-level view of the processing node PN 16 (view A in FIG. 4) is matched to a conceptual view of a network stack (software implementation of a computer networking protocol) from an application point of view (view B in FIG. 4) or a virtual computer (by means of the VE 44) from the end user perspective. This conceptual view of the network stack may include an application layer 46, a middleware 48, a transport layer 50, a network layer 52, and a layer 2 54, i.e., a protocol layer which transfers data between adjacent network nodes in a network.

The first functionality discussed above with regard to providing to the user the allocation of resources based on requirements and/or preferences received from the user may be implemented, in one exemplary embodiment, in the run-time fabric 40 distributed in one or more PNs 16.

For illustrating how the resource allocations is performed by the first functionality run-time fabric 40, assume that user 10 (who may be, for instance, a system or software developer) has a set of droplets X, Y, and Z. A droplet has an identifier, for example, a name. A droplet may have a certain manifestation, which may be a software component (e.g., an executable program). Another manifestation may be a configuration (e.g., a description of settings). The manifestation may also be empty.

To facilitate access to processing elements or to ensure the security of the application, a droplet can also include credentials (e.g., username and/or password, etc.). If the droplet has no manifestation, the droplet may be nothing more than an identifier. In another application, if no manifestation is present, the droplet may include the identifier and the credentials. One example of a droplet is illustrated in FIG. 5, in which the droplet 60 may include the identifier 62, the manifestation 64, and the credentials 66.

Based on the structure of the droplet 60 shown in FIG. 5 and discussed above, the following scenario is discussed next for exemplifying how the run-time fabric 40 automatically handles the resource allocation in network 14 for client 10. Assume that user 10 wishes to deploy the three applications (X, Y, and Z) inside network 14. User 10 may be an Internet company that wants to run various applications inside another operator's network 14. The user 10 has neither direct control over the network 14 nor knowledge of the topology of the network 14. However, the network operator has made available processing nodes PN 16 that could be rented by the user 10 to host applications of user 10.

The applications X, Y and Z of user 10 are desired to be executed on three different processing nodes. In addition, application Z should send data to application Y that in turn should send data to application X, i.e., data should flow according to path Z→Y→X. The conditions discussed in this paragraph are the requirements of user 10. Further, user 10 may have requirements regarding the interconnecting network. For example, user 10 may need at least 50 Mbps bandwidth between applications Z and Y and at least 10 Mbps between applications Y and X. A delay along a path between applications Y and Z should be as small as possible. Furthermore, application X is CPU-intensive and application Y needs large temporary disk storage. Application Z serves users in a given geographical area so that it is desired that application Z is run on processing elements located in this given geographical area.

Having this information that should be communicated from the user 10 to network 14 in order to generate the resource allocation, the user 10 may use a predefined language or protocol to electronically transmit the information to network 14. One possible step to be performed by the user 10 is to generate a set of mapping requirements and/or preferences for each droplet and/or the relation between droplets. An example of such mapping requirements for the present example (i.e., droplets X, Y, Z) is shown in FIG. 6. It is noted that the example shown in FIG. 6 is one of many possible languages to be used by the user when communicating information to the network. However, irrespective of language, it is noted the easiness and simplicity of assembling the requirements and/or preferences at the user side. In another exemplary embodiment, the language used by a user may be different in structure from the language used by another user as long as a part of the network 14 that receives this information is able to translate these different languages to a language that is understood by the processing nodes PN 16 of network 14.

The mapping requirements and/or preferences of the user are transmitted to the network and assembled, for example, as text in a list $L_{mapping\_requirements}$ 70 as shown in FIG. 7. One skilled in the art would appreciate that other formats of the $L_{mapping\_requirements}$ 70 are possible. The collections and assembly may be performed by one or more processing nodes PNs 16 or other servers dedicated for this purpose. This function may be centralized or distributed.

More specifically, in one exemplary embodiment, the $L_{mapping\_requirements}$ 70 is received by a Mapping Logic Unit (MLU) 72 of the run-time fabric 40. The mapping logic unit 72 is a functionality of the run-time fabric 40 and may be implemented as software, hardware or a combination thereof. The mapping logic unit 72 is configured to interact with a network topology module (NT) 74 that is indicative of the network topology of the network 14 and a geographic location module (PE_CAP) 76 that is indicative of the geographic location of the processing elements and their availability. The PE_CAP module 76 also may have other capabilities, as for example, tracking an amount of memory, harddisk, etc. of each processing node PN 16. The network topology module 74 and the geographic location module 76 are shown in FIG. 7 as being located inside network 14 but outside the run-time fabric 40. However, in one exemplary embodiment, it is possible to have one or both of the network topology module 74 and the geographic location module 76 located inside the run-time fabric 40.

The run-time fabric 40, based on the interaction with the network topology module 74 and the geographic location module 76, uses the available information in an algorithm to determine which processing elements/nodes should execute which droplets. This algorithm makes the computing device that runs it a specific computing device. A result of this mapping process by the run-time fabric 40 may be presented as a list $L_{mapping\_result}$ 78 as shown in FIG. 7. As an example not intended to limit the scope of the exemplary embodiments, FIG. 8 shows one detailed possible configuration of the $L_{mapping\_result}$ 78.

The list $L_{mapping\_result}$ 78 may be sent to a Slice Manager Unit (SMU) 80 (see FIG. 9), which may be part of the run-time fabric 40. The slice manager unit 80 may be configured to create processing elements (PE) on the processing nodes PN 16 based on the instructions found in the $L_{mapping\_result}$ 78. However, if the processing element is already listed in the $L_{mapping\_requirements}$ 70, the slice manager unit 80 does not create a new processing element but uses the existing one and indicates the same in the $L_{mapping\_result}$ 78. A processing element PE may be a virtual machine, the processing node PN 16 if virtualization is not used, and/or a part of the PN 16 (e.g., one CPU core in a multi core machine, a line card if it has processing capabilities etc.). The processing element PE has a symbolic identifier that typically differs from the processing node PN identifier. The $L_{mapping\_result}$ 78 may be augmented with the processing elements identifiers, as shown for example in FIG. 10. The slice manager unit 80 may also be configured to generate/check whether any required credentials are present, when some or all of the allocated processing elements require user 10 to be authenticated.

FIG. 9 shows the slice manager unit 80 receiving the $L_{mapping\_requirements}$ 70 and contributing to the updating of the $L_{mapping\_result}$ 78 as new processing elements are created. Also, FIG. 9 shows the slice manager unit 80 creating the processing elements PE 82 on various processing nodes PN 16. In this regard, area A of FIG. 9 shows the processing nodes PN 16 prior to the slice manager unit 80 acting based on the $L_{mapping\_requirements}$ 70 and area B of FIG. 9 shows the created processing elements PE 82 as a consequence of the slice manager unit 80 actions.

Figures 10, 11:
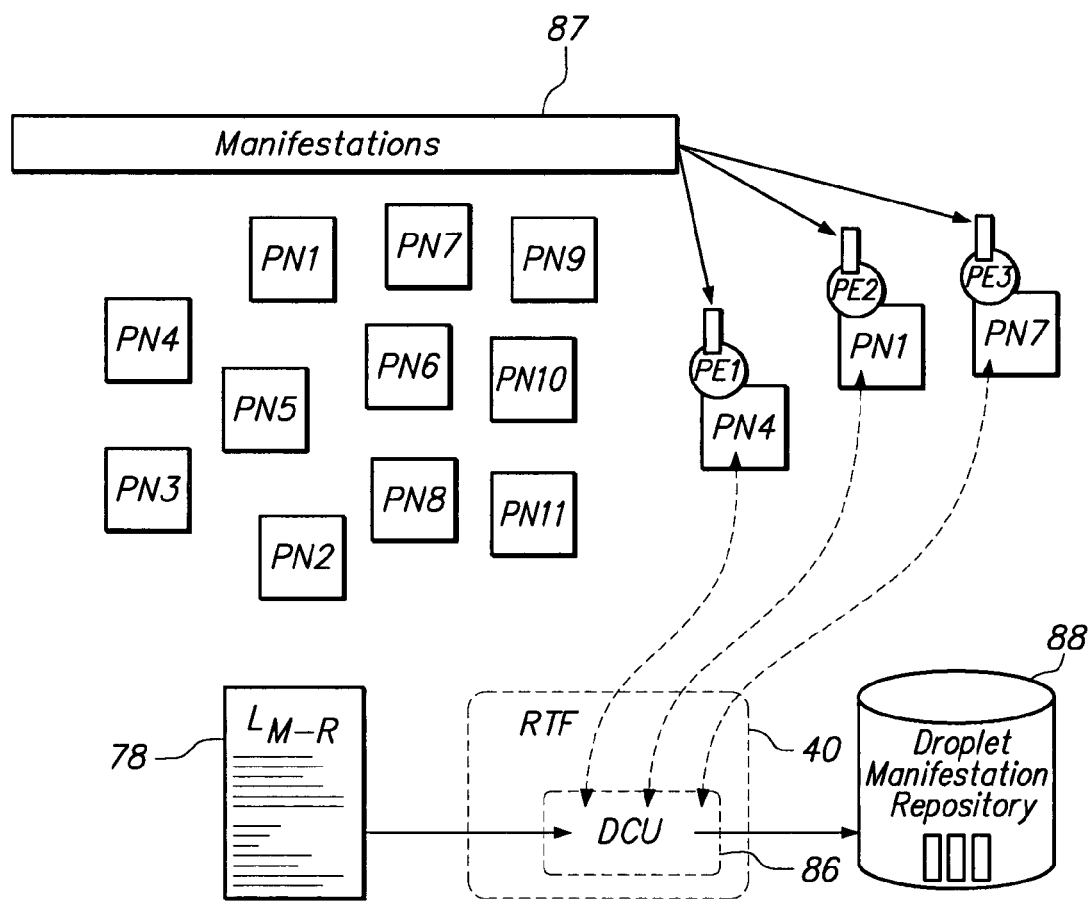
FIG. 10 is a schematic diagram of a more detailed mapping list generated by the functionality according to another exemplary embodiment.
FIG. 11 is a schematic diagram of the functionality according to another exemplary embodiment.

According to an exemplary embodiment, if the droplets include manifestations, a dispatch control unit DCU 86 as shown in FIG. 11, which may be or not part of the run-time fabric 40, provides the manifestations of the droplets. The dispatch control unit 86 may be implemented in software, hardware or a combination thereof and it is configured to receive the $L_{mapping\_result}$ 78. Based on this information, the dispatch control unit 86 is configured to dispatch a corresponding manifestation 87 for a droplet on an appropriate processing element PE 82. The dispatch control unit 86 may use data stored on a droplet manifestation repository unit 88 for determining the appropriate manifestation. The droplet manifestation repository unit 88 may be a storage unit. The user 10 may provide the droplet manifestation related information, for example, when the requirements are provided by the user 10 to the network 14. The dispatch control unit 86 may install and start execution of a software program if that is a manifestation of the droplet.

Some or all of the components discussed above with reference to the run-time fabric 40 provide the first functionality that helps the user 10 to minimize an interaction with the network 14, save time and achieve the desire conditions for its applications that should be run on the network. This first functionality automatically determines the processing elements, their availability, their location and their characteristics based on a request generated by the user.

The first functionality may be further configured to update the processing elements allocation when a configuration of the network or a characteristic changes. For simplicity, this new feature is called the second functionality. However, the first and second functionalities may be implemented in the same software, hardware, or combination thereof.

To illustrate the second functionality, assume that an Internet company 10 intends to deploy a specific application (A) on another operator's network 14. This Internet company has no direct control over the other network but the operator of the network has made available processing nodes PN 16 that could host applications from the Internet company as discussed in the previous exemplary embodiments. Further, assume that the purpose of application A is to provide support for communication with client C (for example, a mobile phone user) and that application A should be executed close to a client C (if the network is a mobile phone network, application A is preferably executed at a location closest to the mobile phone user C).

Figures 12, 13:
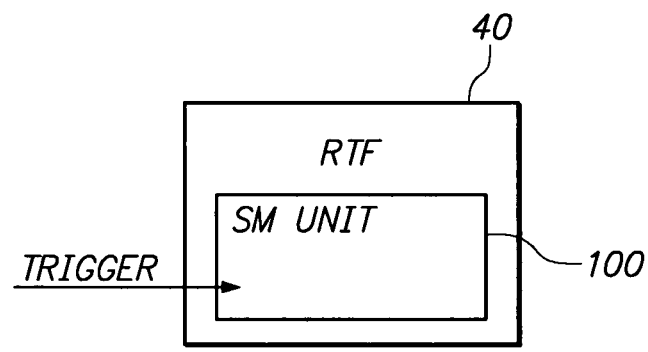
FIG. 12 is a schematic illustration of requirements sent by the user to the network according to an exemplary embodiment.
FIG. 13 is a schematic diagram of a further functionality at a processing node according to an exemplary embodiment.

In addition, there should be a minimum delay propagation between A and C, no more than 2 router hops between A and C and client C needs a non-permanent storage larger than 200 MB. A practical example corresponding to this example is a mobile phone user downloading a movie to his mobile phone while passing a specific cell of the network 14. These requirements may be specified as a set of mapping requirements ($L_{mapping\_requirements}$) as shown in FIG. 12. These requirements may be added to the $L_{mapping\_requirements}$ 70 shown in FIG. 7. Also, it is possible that a processing node PN or processing element PE for application A has been already allocated, as discussed in the previous exemplary embodiments, and the execution of application A has been started. In other words, the Internet company 10 is able to modify the initial $L_{mapping\_requirements}$ 70 after it was processed by the first functionality.

A component of the system including the Internet company 10, the network 14 and client C may be configured to detect that one or more of the given mapping requirements no longer holds. For the above noted example, the component may be application A, client C, the middleware in the processing nodes where application A is executed or some other unspecified monitoring system. In one application, the component may be different from the network and/or client C. A requirement that is violated may be, for example, the result of the failure of a node or a link in the network. In the above specific example, which is not intended to limit the scope of the embodiments, the violated requirement may be a result of the mobile client C moving away from application A in the network 14 (i.e., a geographic area request violation). FIG. 3 illustrated the idea that the component detecting the change in the network and/or a requirement of the user may be outside the network 14 or different from client C by not showing the origin of the arrow labeled as step 36.

After the violation in the mapping requirements is detected, a trigger is generated and sent to a system monitor unit (SM Unit) 100, which may be part of the run-time fabric 40, as shown in FIG. 13. The system monitor unit 100 collects the state change information (in the example above this state may indicate that user C has changed its location and also may include the new location of user C). Other information may be present in the trigger signal, as would be appreciated by those skilled in the art.

Figure 14:
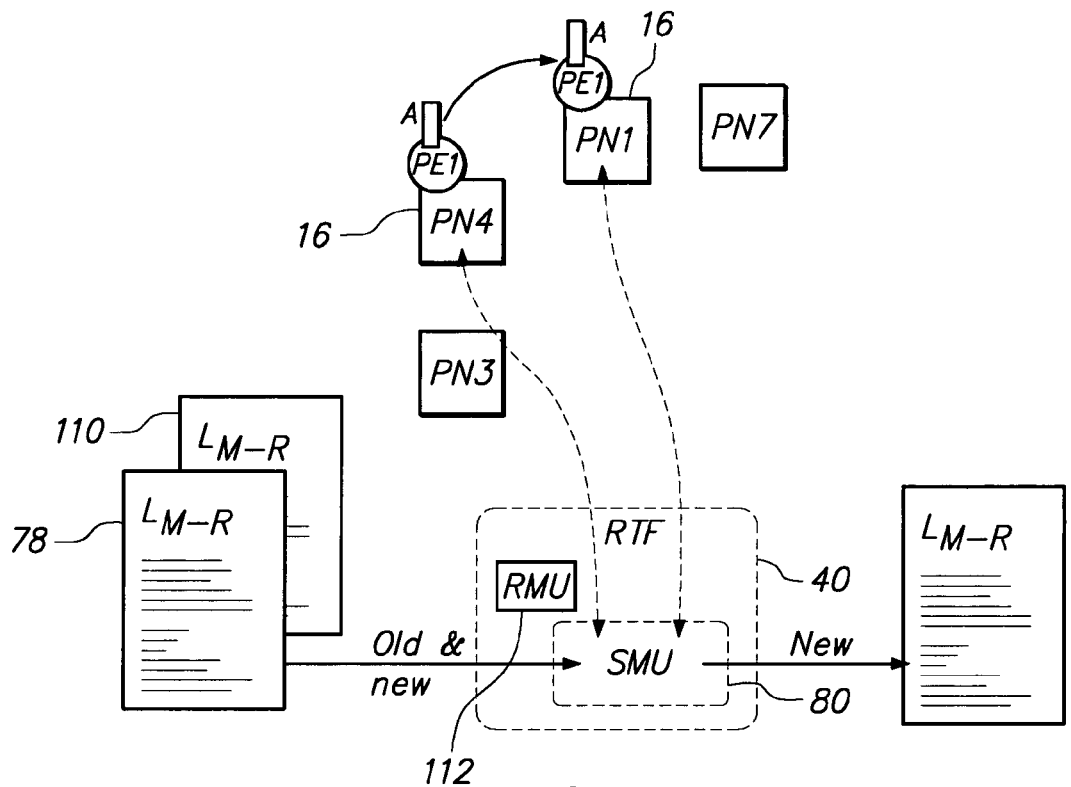
FIG. 14 is a schematic diagram of a relocation functionality according to an exemplary embodiment.

The mapping logic unit 80 shown in FIG. 9 may be configured to execute and compute the new processing elements allocation that fulfills the requirements and/or preferences noted in the $L_{mapping\_requirements}$ 70 for the modified network or characteristic. A result of this computation may be a new mapping result, which may be represented as list $L_{new\_mapping\_result}$ 110, as shown in FIG. 14. The new $L_{new\_mapping\_result}$ 110 may be compared with the previous state of the system, i.e., $L_{mapping\_result}$ 78. If the $L_{new\_mapping\_result}$ 110 is the same as $L_{mapping\_result}$ 78, a better system state could not be found and no change is needed. This result determines the run-time fabric 40 to wait for a new trigger.

However, if the $L_{new\_mapping\text{-}result}$ 110 differs from $L_{mapping\_result}$ 78, a better mapping has been found and the network 14 needs to be reconfigured. The old and the new $L_{mapping\_results}$ are sent to a Reconfiguration Management Unit (RMU) 112, which is configured to relocate processing elements PE of the network 14, for example, to run application A on a node PN1, processing element PE1 of the network 14 that is closer to the client C than a current node PN4, processing element PE1, as shown in FIG. 14. The reconfiguration management unit 112 may be implemented in the run-time fabric 40.

The new $L_{new\_mapping\_result}$ list is revised to contain the updated PE/PN mappings and the reconfiguration management unit 112 may interact with the run-time fabric 40 (for example, middleware) on all involved processing nodes to inform them about the updated mappings so that the communication flow can be preserved.

Thus, according to some of the exemplary embodiments, the second functionality, which may or may not be part of the first functionality, can be configured to receive a trigger indicative of a network change, client change, or other factors that affect the requirements and/or preferences of user 10, to automatically and dynamically redo the processing elements allocation, and/or relocate the processing elements to new processing nodes. Thus, according to an exemplary embodiment, the entire process of allocation update is performed in the network 14, reducing the involvement of the user 10.

In one exemplary embodiment, the processing elements and executing applications can be automatically relocated in the network in response to changing conditions, such as link failure, node failure, mobile clients relocating to new positions in the network. In another exemplary embodiment, this functionality relieves the application system developer of many problems related to creating resilient and robust distributed software. In still another exemplary embodiment, it is possible for the execution platform to be optimized for low energy consumption by being able to dynamically move a processing element between high performance/high energy consumption nodes to lower performance/less energy-consuming nodes (for example based on application system load). Still in another exemplary embodiment, the functionality allows the network operator to deploy processing nodes (e.g. servers) in its network and make those nodes available to third parties without having to reveal details about how the network is designed and structured. The users 10 can still request servers based on location requirements or other criteria without having to know all the internal details of network 14.

Figure 15:
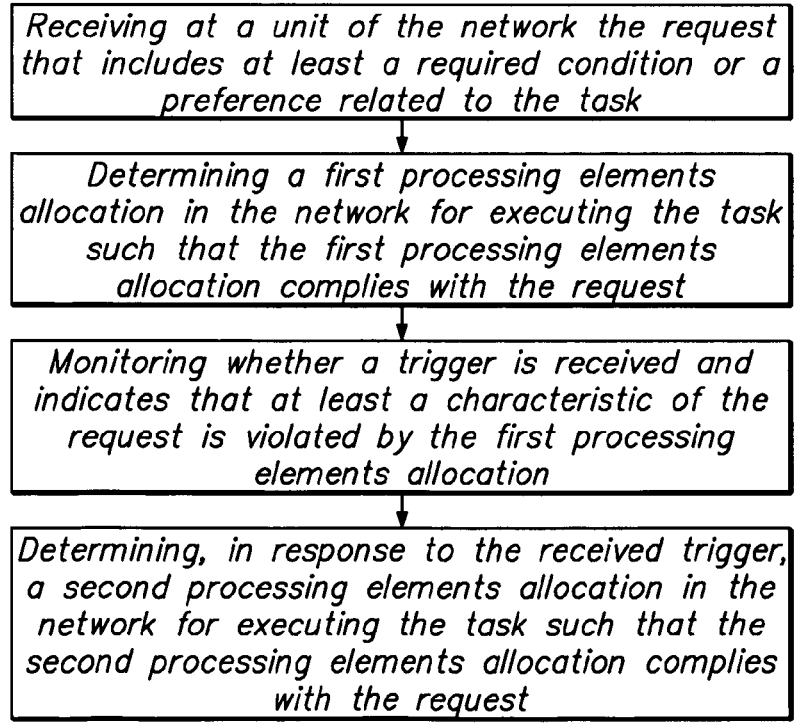
FIG. 15 is a flow chart illustrating steps of a method for updating a processing elements allocation according to an exemplary embodiment.

A method for providing dynamic processing elements allocation in a network for a task of a user based on a request of the user is discussed with reference to FIG. 15. The method includes a step 1500 of receiving at a unit of the network the request that includes at least a required condition or a preference related to the task, a step 1510 of determining a first processing elements allocation in the network for executing the task such that the first processing elements allocation complies with the request, a step 1520 of monitoring whether a trigger is received and indicates that at least a characteristic of the request is violated by the first processing elements allocation, and a step 1530 of determining, in response to the received trigger, a second processing elements allocation in the network for executing the task such that the second processing elements allocation complies with the request.

The unit may be a processing node and a processing element may be a logical unit. The logical unit may be hosted by the processing node or another processing node. Optionally, the method may include a step of running a middleware software at the unit to implement a functionality that determines the first and second processing elements allocations and/or a step of generating the trigger in a processing node of the network. Alternatively, the trigger may be generated at a client or by an application run by the user. Further, the method of FIG. 15 may include a step of generating the trigger after the user has changed location, or a link in the network has failed, or a processing node has failed and/or a step of implementing the second processing element allocation in the network by relocating processing elements from a first processing node to a second processing node. Additionally, the method of FIG. 15 may include creating processing elements of the first and second processing elements allocations on processing nodes that exist in the network, wherein the processing nodes are real machines and the processing elements are at least one of the processing nodes, a part of the processing nodes, or a virtual machine running on the real machines.

Figure 16:
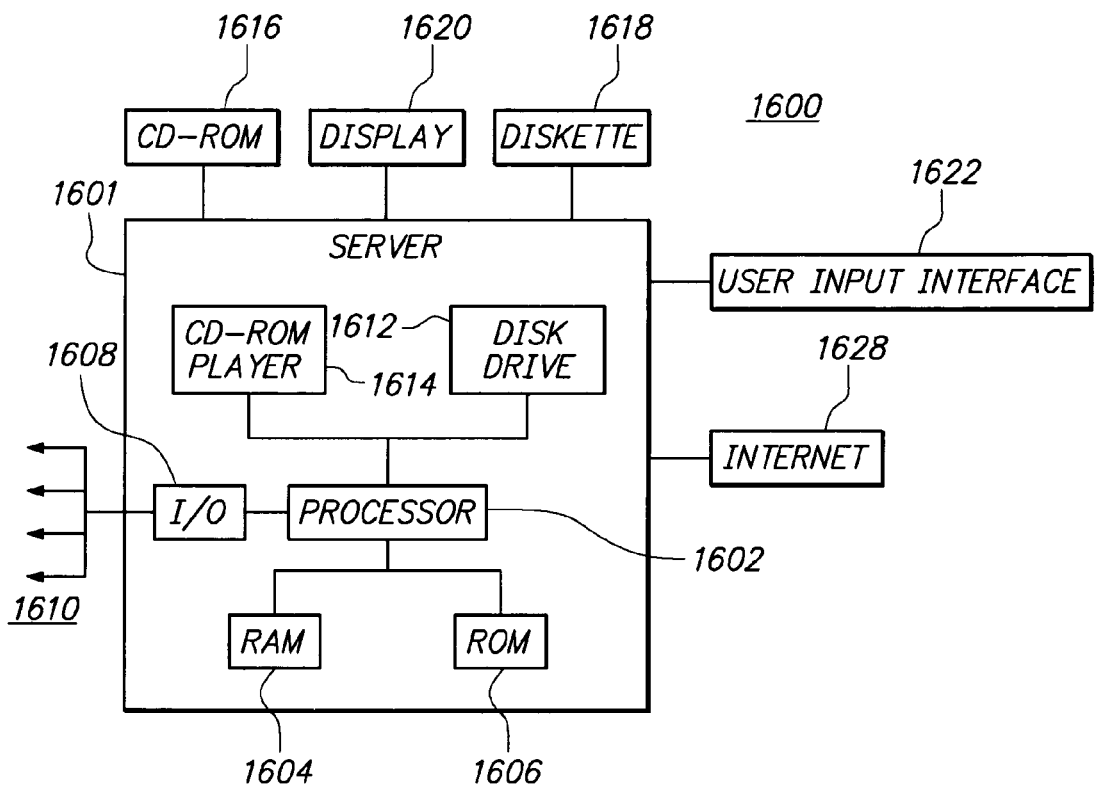
FIG. 16 is schematic diagram of a processing node for implementing the functionality.

For purposes of illustration and not of limitation, an example of a representative processing node capable of carrying out operations in accordance with the exemplary embodiments is illustrated in FIG. 16. The structure shown in FIG. 16 may also be used to implement the run-time fabric 40 and/or other units discussed in the exemplary embodiments. It should be recognized, however, that the principles of the present exemplary embodiments are equally applicable to other computing systems. Hardware, firmware, software or a combination thereof may be used to perform the various steps and operations described herein.

The exemplary processing node 1600 suitable for performing the activities described in the exemplary embodiments may include server 1601. Such a server 1601 may include a central processor (CPU) 1602 coupled to a random access memory (RAM) 1604 and to a read-only memory (ROM) 1606. The ROM 1606 may also be other types of storage media to store programs, such as programmable ROM (PROM), erasable PROM (EPROM), etc. The processor 1602 may communicate with other internal and external components through input/output (I/O) circuitry 1608 and bussing 1610, to provide control signals and the like. The processor 1602 carries out a variety of functions as is known in the art, as dictated by software and/or firmware instructions.

The server 1601 may also include one or more data storage devices, including hard and floppy disk drives 1612, CD-ROM drives 1614, and other hardware capable of reading and/or storing information such as DVD, etc. In one embodiment, software for carrying out the above discussed steps may be stored and distributed on a CD-ROM 1616, diskette 1618 or other form of media capable of portably storing information. These storage media may be inserted into, and read by, devices such as the CD-ROM drive 1614, the disk drive 1612, etc. The server 1601 may be coupled to a display 1620, which may be any type of known display or presentation screen, such as LCD displays, plasma display, cathode ray tubes (CRT), etc. A user input interface 1622 is provided, including one or more user interface mechanisms such as a mouse, keyboard, microphone, touch pad, touch screen, voice-recognition system, etc.

The server 1601 may be coupled to other computing devices, such as the landline and/or wireless terminals via a network. The server may be part of a larger network configuration as in a global area network (GAN) such as the Internet 1628, which allows ultimate connection to the various landline and/or mobile client devices.

The disclosed exemplary embodiments provide a unit of a processing node, a method and a computer program product for automatically updating processing elements allocations in a network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for providing dynamic processing elements allocation in a network for a task of a user based on a request of the user, the method comprising:
    receiving, at a device of the network, the request that includes at least a required condition or a preference related to the task;
    determining a first processing elements allocation in the network for executing the task such that the first processing elements allocation complies with the request;
    providing the first processing elements allocation to enable the user to perform the task using the first processing elements allocation;
    monitoring whether a trigger is received, the trigger including information indicating that the first processing elements allocation does no longer comply with the request;
    determining, in response to the received trigger, a second processing elements allocation in the network for executing the task, such that the second processing elements allocation complies with the request; and
    if the second processing elements allocation is different from the first processing elements allocation, providing the second processing elements allocation to enable the user to continue performing the task using the second processing elements allocation,
    wherein the request is not modified between the determining of the first processing elements allocation and the determining of the second processing elements allocation.

2. The method of claim 1, wherein the device is a processing node and a processing element specified in the first or second processing elements allocation is a logical device.

3. The method of claim 2, wherein the logical device is hosted by the processing node or another processing node.

4. The method of claim 1, further comprising:
    running a middleware software at the device to implement a functionality that automatically determines the first and second processing elements allocations.

5. The method of claim 1, further comprising:
    generating the trigger in a processing node of the network.

6. The method of claim 1, further comprising:
    receiving the trigger from outside the network as the trigger is generated outside the network.

7. The method of claim 6, further comprising:
    generating the trigger at a client of the network, or generating the trigger by an application run by the user in the network.

8. The method of claim 1, further comprising:
    generating the trigger after a client of the network has changed a location, or a link in the network has failed, or a processing node of the network has failed.

9. The method of claim 1, further comprising:
    implementing the second processing elements allocation in the network by relocating processing elements from a first processing node to a second processing node.

10. The method of claim 1, further comprising:
    creating processing elements of the first and second processing elements allocations on processing nodes that exist in the network, wherein the processing nodes are real machines and the processing elements are at least one of the processing nodes, a part of the processing nodes, or a virtual machine running on the real machines.

11. A unit in a network for providing dynamic processing elements allocation in the network for a task of a user based on a request of the user, the unit comprising:
    a processor configured
        to receive the request that includes at least a required condition or a preference related to the task,
        to determine a first processing elements allocation in the network for executing the task such that the first processing elements allocation complies with the request,
        to provide the first allocation to enable the user to perform the task using the first processing elements allocation,
        to monitor whether a trigger is received, the trigger including information indicating that the first processing elements allocation does no longer comply with the request,
        to determine, in response to the received trigger, a second processing elements allocation in the network for executing the task such that the second processing elements allocation complies with the request, and
        to provide the second processing elements allocation to enable the user to continue performing the task using the second processing elements allocation, if the second processing elements allocation is different from the first processing elements allocation; and
    a memory configured to store one or more pieces of information used by the processor,
    wherein the request is not modified between determining of the first processing elements allocation and the determining of the second processing elements allocation.

12. The unit of claim 11, wherein the unit is a processing node and a processing element specified in the first or second processing elements allocation is a logical unit.

13. The unit of claim 12, wherein the logical unit is hosted by the processing node or another processing node.

14. The unit of claim 11, wherein the processor is further configured to execute a middleware software to implement a functionality that automatically determines the first and second processing elements allocations.

15. The unit of claim 11, wherein the processor is further configured to generate the trigger in a processing node of the network.

16. The unit of claim 11, wherein the processor is further configured to receive the trigger from outside the network as the trigger is generated outside the network.

17. The unit of claim 11, wherein the processor is further configured to generate the trigger after a client of the network has changed a location, or a link in the network has failed, or a processing node of the network has failed.

18. The unit of claim 11, wherein the processor is further configured to implement the second processing elements allocation in the network by relocating processing elements from a first processing node to a second processing node.

19. The unit of claim 11, wherein the processor is further configured to create processing elements of the first and second processing elements allocations on processing nodes that exist in the network, the processing nodes are real machines and the processing elements are at least one of the processing nodes, a part of the processing nodes, or a virtual machine running on the real machines.

20. A non-transitory computer readable medium storing computer executable instructions, wherein the instructions, when executed, implement a method for providing dynamic processing elements allocation in a network for a task of a user based on a request of the user, the method comprising:
providing a system comprising distinct software modules, wherein the distinct software modules comprise a run-time fabric module and a mapping logic module;
receiving, at the run-time fabric module, the request that includes at least a required condition or a preference related to the task;
determining, at the mapping logic module, a first processing elements allocation in the network for executing the task such that the first processing element allocation complies with the request;
providing the first processing elements allocation to enable the user to perform the task using the first processing elements allocation;
monitoring whether a trigger is received, the trigger including information indicating that the first processing elements allocation does no longer comply with the request;
determining, in response to the received trigger, a second processing elements allocation in the network for executing the task such that the second processing elements allocation complies with the request; and
if the second processing elements allocation is different from the first processing elements allocation, providing the second processing elements allocation to enable the user to continue performing the task using the second processing elements allocation, wherein the request is not modified between determining of the first processing elements allocation and the determining of the second processing elements allocation.

21. The method of claim 1, wherein at least one of the first processing elements allocation and the second processing elements allocation includes at least two processing elements.

22. The method of claim 1, wherein the required condition or preference related to the task refers to communication requirements between processing elements in the first and the second processing elements allocation.

\* \* \* \* \*